United States Patent [19]
Eckstein

[11] 3,981,452
[45] Sept. 21, 1976

[54] IRRIGATION PIPES WITH DRIPPER UNITS AND METHOD OF ITS MANUFACTURE

[76] Inventor: Gershon Eckstein, 9 Naomi St., Har Hacarmel, Haifa, Israel

[22] Filed: Feb. 10, 1975

[21] Appl. No.: 548,736

[52] U.S. Cl. ............................................. 239/542
[51] Int. Cl.² ....................................... B05B 15/00
[58] Field of Search .................................. 239/542

[56] References Cited
UNITED STATES PATENTS

| | | | |
|---|---|---|---|
| 3,604,728 | 9/1971 | Symcha et al. | 239/542 |
| 3,729,142 | 4/1973 | Garza et al. | 239/542 |
| 3,806,036 | 4/1974 | Olson | 239/542 |
| 3,887,138 | 6/1975 | Gilead | 239/542 |
| 3,897,009 | 7/1975 | Rangel-Garza | 239/542 |

*Primary Examiner*—Robert R. Song
*Assistant Examiner*—Gene A. Church
*Attorney, Agent, or Firm*—Perry Carvellas

[57] ABSTRACT

An irrigation pipe constitutes at predetermined spacings the outer sleeve of an irrigation unit, whose inner part comprises a cylinder with a peripheral helical groove. A method for producing such a pipe comprises feeding said cylinder at predetermined intervals into an extruder having an angular extrusion nozzle head and extruding said pipe around it, and after cooling said pipe sufficiently making at least one aperture therein aligned with the forward end of said groove in said cylinder.

7 Claims, 3 Drawing Figures

U.S. Patent  Sept. 21, 1976  3,981,452
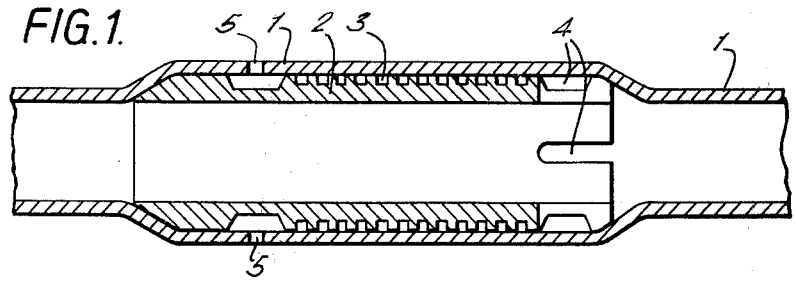
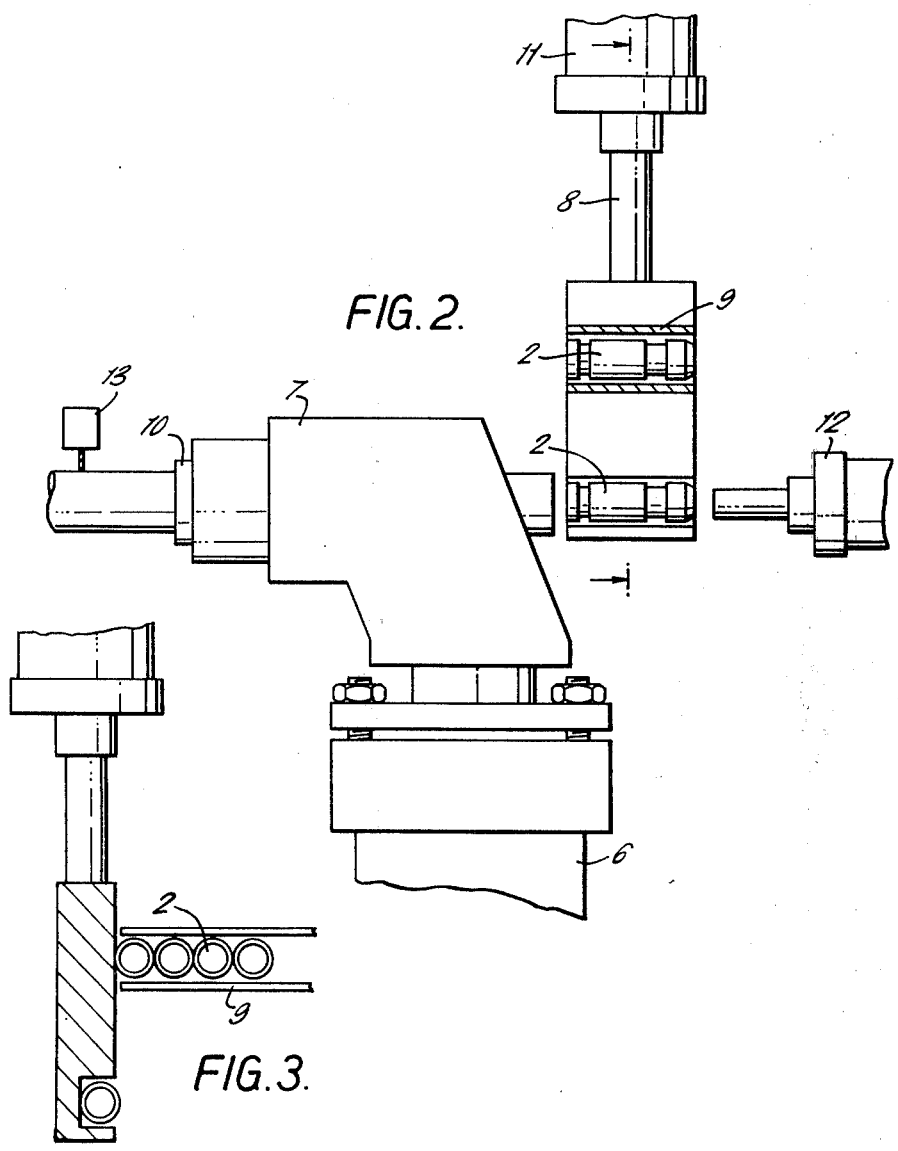

IRRIGATION PIPES WITH DRIPPER UNITS AND METHOD OF ITS MANUFACTURE

The present invention concerns an irrigation pipe with integrally built-in dripper units and a method of manufacture of such a pipe.

The invention concerns particularly an irrigation pipe with a dripper unit of the kind comprising a cylinder provided with a continuous groove on its peripheral surfaces and being tightly surrounded by a sleeve, the groove having an integral inlet in said cylinder while an outlet therefrom is provided in the sleeve. The said groove may be a continuous spiral, may have a labyrinth path or may be of any of the known shapes, which reduce the pressure of the water from the supply pipe, so that it leaves the dripper unit in a trickle.

Such a dripper unit will hereinafter be referred to as "a dripper unit of the kind defined".

A dripper unit of the kind defined has up to now been manufactured with screw threads at both ends or with any other suitable means, so that it could be connected to an irrigation pipe adapted for this purpose.

It is an object of the present invention to provide an irrigation pipe with a dripper unit of the kind defined in which the dripper units constitute an integral part of the pipe without the necessity of assembling them at the irrigation site. It is obvious that because of such a pipe much labour and time is saved when laying the pipe for irrigation, since the units do not have to be attached at the required spaces.

The invention consists in an irrigation pipe for drip irrigation, characterized in that it includes at predetermined spaces dripper units of the kind defined, the pipe constituting the outer sleeve of said unit.

The invention further consists in a method of producing a pipe for drip irrigation, characterized in that during the extrusion of the pipe by a machine having an angular extrusion nozzle head the cylinder of a dripper unit, as hereinabove defined, is fed towards said head and is pushed into said head at predetermined intervals, so that the pipe is extruded around it and thereafter making at least one aperture in the pipe aligned with the said outlet from said groove of said cylinder.

The invention is illustrated, by way of example only, in the accompanying drawings in which:

FIG. 1 is a longitudinal section of an irrigation pipe according to the invention, containing a dripper unit as hereinbefore defined;

FIG. 2 is a schematic elevational view of a machine for manufacturing a pipe for drip irrigation according to the invention;

FIG. 3 is a side elevation illustrating the dripper feed mechanism.

In FIG. 1 is shown an extruded irrigation pipe 1 which serves as a sleeve of a dripper unit having a cylindrical part 2 and being provided with a peripheral helicoidal groove 3. An inlet 4 made in the cylindrical part 2 leads from the interior of pipe 1 into groove 3 while an outlet 5 from said groove is provided in the pipe.

As can be seen in FIG. 1, pipe 1 is stretched somewhat over the cylinder 2, i.e., the pipe is of larger diameter in the region of cylinder 2. However, the internal diameter of pipe 1 and cylinder 2 are equal, so that free flow of that part of the water which does not enter grooves 3 is permitted through part 2.

The pipe of FIG. 1 is produced as can be seen in FIG. 2 in an extruder 6 having a head 7 at an angle to the extension of the screw (not shown). This type of head 7 is known for producing covered cables or sheathed wires.

Behind said head a dripper unit feed mechanism generally indicated by 8 is provided. This mechanism comprises a storage unit 9 in which a plurality of inner dripper parts 2 are disposed. These cylindrical parts 2 are fed into a position coaxial with the extruder nozzle 10 by a piston - operated feed device 11 which may be actuated by hydraulic, pneumatic or other means.

At predetermined time periods or, if desired, at predetermined distances, i.e. after a predetermined length of pipe has been extruded, a dripper part 2 is fed into the extruder head 7 by means of a pusher mechanism 12, which may be operated by pneumatic, hydraulic or other means. When such a part 2 is inserted into the extruder head 7, the pipe is extruded around it through nozzle 10.

A sensing mechanism in combination with a drill, knife point or the like indicated generally at 13 is provided near the extrusion nozzle at a distance to permit the cooling of the pipe after its extrusion. This drill 13 makes an outlet 5 in the wall pipe in the required position. If desired, two such mechanisms may be provided in diametrically opposite positions to make two apertures 5 in pipe 1 as shown in FIG. 1.

The control of the feed mechanism, push mechanism 12 and drilling mechanism 13 can be effected in any suitable manner, either by electical, electronic, mechanical or the like outrolled means.

I claim:

1. A continuous irrigation pipe with integrally built-in dripper units spaced at predetermined intervals having an aperture in alignment with each of said units, said dripper units having an inlet and an outlet, the inlet being in communication with the interior of the pipe and the outlet being in communication with the aperture and the exterior of the pipe.

2. The irrigation pipe of claim 1 wherein said dripper units have a peripheral helical groove and said dripper units are tightly surrounded by said pipe which forms an outer sleeve around said dripper unit.

3. An irrigation pipe for drip irrigation comprising a continuous pipe and dripper units disposed within said pipe at predetermined spaced intervals and said pipe constituting an outer sleeve for said units.

4. An irrigation pipe for drip irrigation comprising a continuous pipe and pressure reducing dripper units disposed within said pipe at predetermined spaced intervals, said pipe being stretched over and being of larger diameter in the region of said units to accommodate said units, said pipe having an aperture in alignment with each of said dripper units, said dripper units having an outlet and an inlet, the inlet being in communication with the interior of the pipe and the outlet being in communication with the aperture and the exterior of the pipe.

5. The dripper unit of claim 4 wherein the internal diameter of the dripper unit and the internal diameter of the pipe are about the same.

6. The pipe of claim 4 wherein said pressure reducing means comprises a groove on the peripheral surface thereof and the pipe tightly surrounding said pressure reducing means and forming a sleeve for said means.

7. The pressure reducing means of claim 4 comprising a peripheral helical groove.

* * * * *